3,053,875
MANUFACTURE OF TRIMETHYL PHOSPHATE

Palmer A. Brown, Gerald W. Kottong, Herbert F. Kraemer, and Arthur F. Limper, Baton Rouge, La., assignors to Ethyl Corporation, New York, N.Y., a corporation of Delaware
No Drawing. Filed June 17, 1960, Ser. No. 36,724
9 Claims. (Cl. 260—461)

This invention relates to a process for the manufacture of trimethyl phosphate, especially to an improved and continuous process for the large scale commercial manufacture of this phosphate ester. In particular, this invention is concerned with the recovery of trimethyl phosphate from a reaction mass resultant from the reaction of methanol and phosphorus oxychloride.

Trimethyl phosphate has long been known to be useful as an additive for gasoline (U.S. 2,427,173). However, until now there has been no commercially acceptable process for the large-scale manufacture of this compound. An important reason why known processes have not been adaptable to commercial practice is because of the poor yields of trimethyl phosphate resultant therefrom. The best yields of trimethyl phosphate by any of the heretofore known processes have been in the order of only 20 to 40 percent.

A well known theoretically possible reaction for the production of trimethyl phosphate is the reaction of methanol with phosphorus oxychloride:

(I)   $3CH_3OH + POCl_3 \rightarrow (CH_3O)_3PO + 3HCl$

Unfortunately however, in actual practice this reaction does not yield trimethyl phosphate in the desired stoichiometric quantities. A principal problem encountered in this process is the very undesirable adverse side reaction of trimethyl phosphate with the co-product hydrogen chloride:

(II)   $(CH_3O)_3PO + HCl \rightarrow (CH_3O)_2POOH + CH_3Cl$

This adverse reaction with hydrogen chloride is far more serious in manufacturing trimethyl phosphate than in generally similar reactions to produce other phosphate esters. Trimethyl phosphate is far more susceptible to attack and the reaction occurs as long as the hydrogen chloride and the trimethyl phosphate are in contact, and it is particularly acute during operations leading to the separation of the products. To make matters worse, there is three hundred percent as much hydrogen chloride formed as there is trimethyl phosphate so that the extent of the cleavage reaction can be far-reaching and result in total destruction of the desired product. The cleavage reaction is extremely difficult to control and it even occurs at temperatures as low as −70° C. Consequently, separation of the hydrogen chloride from the reaction mass is an extremely difficult operation, and no practical way has heretofore been found to substantially reduce the undesirable cleavage of the trimethyl phosphate so that large-scale commercial manufacture of this ester could become a reality.

Another very serious cleavage problem is also produced by unesterified P–Cl bonds, particularly the P–Cl bonds within the compound dimethyl phosphoryl chloride, an intermediate in the reaction between methanol and phosphorus oxychloride which cannot be separated from methanol-phosphorus oxychloride reaction masses by any known practical methods. Under conditions required for the separation of the reaction products this incompletely esterified compound condenses with the cleavage acids produced in reaction II (forming P–O–P bonds) to liberate even more hydrogen chloride. Thus, the potentially esterifiable dimethyl phosphoryl chloride is not only prevented from forming trimethyl phosphate but in addition produces still more hydrogen chloride which in turn reacts with trimethyl phosphate to produce even more cleavage acids and methyl chloride. This sequence of reactions is as follows:

(III)
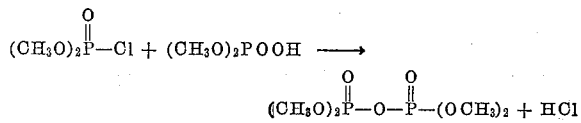

(IV)   $(CH_3O)_3PO + HCl \longrightarrow (CH_3O)_2POOH + CH_3Cl$

These adverse reactions, symbolized by Equations II, III and IV, are particularly acute under the necessary conditions imposed by normal distillation to affect separation of the reaction mass into its component parts. For example, it is known in the prior art that when the separation of hydrogen chloride from trimethyl phosphate is attempted, even under very mild conditions that the yield of trimethyl phosphate decreases considerably even when the hydrogen chloride concentration in the feed is as little as ten mole percent. Thus, a major and significant factor contributing to the failure of utilizing the methanol - phosphorus oxychloride reaction in a commercial process is the inability to attain a practical method for separating the products of reaction, particularly the hydrogen chloride from the trimethyl phosphate.

Another serious problem is that of producing an essentially chloride-free trimethyl phosphate product. Because of the extreme corrosiveness of such chlorides on engine parts, it is absolutely essential that the chlorides in the trimethyl phosphate product be maintained at a very low level.

Nevertheless, despite these and other disadvantages, it is an object of the present invention to provide an improved process for the recovery of trimethyl phosphate from a reaction mass containing considerable amounts, or capable of generating considerable amounts, of hydrogen chloride. In particular, it is an object of this invention to provide a process capable of recovering trimethyl phosphate in high yields from a methanol-phosphorus oxychloride reaction mass. It is also an object of the present invention to provide such a process which is suitable for use on a commercial scale to give high yields, i.e., above about 80 percent of trimethyl phosphate, and which at the same time avoids the excess formation or accumulation, of undesired by-products. In particular, it is an object to provide a continuous process for the separation of the trimethyl phosphate from the reaction mixture without excess cleavage, thereof. Also, it is an object to provide a continuous separation process in which an essentially chloride-free trimethyl phosphate product can be simply and easily recovered by distillation and without the need for neutralization of the by-product hydrogen chloride.

These and other objects are achieved in accordance with the present invention which provides a completely novel and unique process for the separation of trimethyl phosphate from a reaction mixture, particularly from such a mixture resultant from the reaction of methanol and phosphorus oxychloride. The process in general comprises continuously feeding a reaction mass or charge including unreacted methanol, hydrogen chloride, and trimethyl phosphate into a first separation zone under specified conditions greatly minimizing cleavage reactions. From one part of the zone is withdrawn a hydrogen chloride-rich fraction consisting essentially of the unreacted methanol, hydrogen chloride and methyl chloride; and from another portion of the zone is withdrawn a second fraction consisting essentially of trimethyl phosphate, cleavage acids and residual amounts of hydrogen chloride. The second fraction—i.e., the residual reaction mixture—is then fed into a second zone wherein it is subjected to more stringent conditions which remove even residual amounts of hydrogen chloride, and reduce the quantity of chlorides. The second fraction, in a preferred embodiment, can even thereafter be subjected to particular conditions in a staged reaction zone which even further reduce or remove chloride impurities. This charge, or second fraction, free or essentially free of chlorides, can thereafter be charged into another zone for separation of high purity trimethyl phosphate by distillation.

The series of interrelated steps making possible the commercial realization of a process for the manufacture of trimethyl phosphate include regulation and control of the quantities of hydrogen chloride and compounds containing P–Cl bonds which are fed into the first separation zone. Thus, a particular and novel feature of this invention is that it makes possible the utilization of a feed charge containing up to about 35 mole percent hydrogen chloride, based on the total number of moles of the components in the feed. Greater amounts of hydrogen chloride in the feed can be permitted, though the trimethyl phosphate yield is considerably reduced. As was stated heretofore, in prior art processes even when the hydrogen chloride in the feed is as much as about 10 mole percent, the yield of trimethyl phosphate product is drastically low. Pursuant to this invention however, high yields of high purity trimethyl phosphate can be obtained even when the hydrogen chloride concentration of the feed is within a range of from about 10 to about 35 mole percent, based on the total moles of feed. Optimum yields are generally obtained by maintaining the hydrogen chloride in the feed within a range of from about 10 to about 25 mole percent, based on the total feed.

The present invention also makes possible the utilization of a feed charge containing a fairly high concentration of compounds containing P–Cl bonds. Thus, pursuant to this invention charges can be handled even wherein the phosphorus as P–Cl bonds is up to about 10 mole percent of the total phosphorus in the feed charge. Optimum yields of trimethyl phosphate however can be obtained when the phosphorus, as P–Cl, is not more than from about 3 mole percent to about 6 mole percent, based on the total phosphorus present in the feed.

In the separation of these trimethyl phosphate reaction mixtures it is necessary to rapidly and essentially completely separate hydrogen chloride from the trimethyl phosphate under such conditions that cleavage of the trimethyl phosphate is reduced to an extremely low level. This is accomplished by feeding the reaction mass into a zone, preferably a multistage zone, wherein the temperature and residence time therein are very low, thus in a sense flashing off the major proportion of the hydrogen chloride. The "topped" reaction mass is then subjected to a much greater temperature and longer residence time in a second zone to completely remove the residual amounts of hydrogen chloride.

By thus dividing the separation into two steps a preponderance of the hydrogen chloride is separated from the reaction mixture at low temperature and residence time so as to minimize the cleavage reactions. The reaction mixture is then treated under more stringent conditions to insure complete removal of any hydrogen chloride and also under such conditions as to reduce the concentration of chlorides in the mixture. These separate phases are preferably carried out under conditions wherein the first separation of hydrogen chloride is, or approximates, a multistage separation under the desired conditions. The method is conveniently carried out, for example, in such apparatus as a packed tower provided with a reboiler. The packed tower is maintained at low temperature and with only as light temperature gradient from top to bottom. The packings are of such size as to minimize the volume of the tower to provide the desired low residence time and also to provide a large surface area over which the liquid flows. The reboiler provides sufficient unfilled volume to also provide therein a desired residence time. The reboiler is maintained at a much higher temperature than the column to provide complete removal of the hydrogen chloride, destruction of chlorides, and also to provide vapor to the packed column to effect a multistage stripping operation.

The first separation zone, as a packed column, is maintained at a temperature of from about −10° F. to about 125° F., and at a pressure of from about 0.1 pound per square inch to about 0.6 pound per square inch (5 mm. Hg to about 30 mm. Hg). The second separation zone, as in a reboiler associated with a packed column, is maintained at a temperature of from about 180° F. to about 290° F. and preferably at a pressure of from about 0.1 to about 3 pounds per square inch (5 mm. Hg to about 150 mm. Hg). Significant departures from these ranges of temperature to higher temperatures are accompanied by significant lessening of trimethyl phosphate yields and even adverse effects upon the purity of the trimethyl phosphate. Lower temperatures than these are feasible by corresponding pressure reductions, but are generally not commercially feasible because of increased costs in equipment. For optimum yields the temperature within the first separation zone (or within the packed column) should preferably be within a range of from about 30° F. to about 70° F. Within the second zone (as in a reboiler) the temperature is preferably maintained within a range of from about 180° F. to about 230° F.

The residence time of the reaction mixture within the first separation zone at the desired temperature of operation should generally be no less than about 1 minute and generally not more than about 7 minutes. Thus, the feed initially fed into the separation zone is rapidly brought up to the desired temperature and maintained substantially at this temperature for the entire residence time. A greater or lesser residence time is not generally desirable. Significantly shorter residence times provide insufficient time for removal of the preponderance of the hydrogen chloride from the reaction mixture. Significantly greater residence times result in cleavage of the trimethyl phosphate and consequent reductions in the yield of this ester. Preferably, the residence time is from about 3 minutes to about 5 minutes for maximum yield of high purity trimethyl phosphate. In the second zone the residence time is considerably longer. The residence time within this portion of the first hydrogen chloride separation zone is generally from about 0.75 to about 2 hours but is preferably from about 50 to about 80 minutes for optimum yields of high purity trimethyl phosphate, and for best results in reacting out or destroying chloride impurities. Significant departures beyond the broader range of residence time produce significantly decreased yields of trimethyl phosphate.

A significant feature of this invention, pursuant to use of the above conditions, is the removal of even the very small quantities of chloride impurities which, as heretofore stated, cannot be tolerated to any significant extent within the trimethyl phosphate product. In accordance with a highly preferred embodiment, chloride impurities are even further lessened. Thus, in this embodiment the reaction mixture from the second zone is fed into a multistage intermediate zone prior to the removal of the trimethyl phosphate by distillation. By proper holdup time and temperature control within the intermediate zone, small quantities of chlorides within this portion of the product react with minute quantities of the trimethyl phosphate to form pyrophosphates which are easily separated from the trimethyl phosphate during distillation. Thus, for example, wherein the second zone is a reboiler containing the hydrogen chloride-free reaction mixture, but containing some chlorides, a tube of such size as to provide a minimum residence time of about 10 minutes is provided between the reboiler and a distillation zone. The reaction mixture is then transferred from the reboiler through the tube to the distillation zone. There is thus provided a stirred pot reactor in combination with a multistage reactor. Within the latter, reaction and elimination of the harmful chlorides occur. A highly preferred residence time to obtain maximum yields of low chloride content, high purity trimethyl phosphate is from about 10 to about 50 minutes, at the temperature within the reboiler or second separation zone.

After removal of the methanol and hydrogen chloride from the reaction mixture in accordance with the foregoing specified conditions, the residual charge, essentially free or very low in chloride impurities, can then be fed into another separation zone wherein the products are further separated by distillation. By distilling the residual reaction mixture under specified conditions, high yield, high purity trimethyl phosphate is completely separated from the reaction mixture. By maintaining an overhead temperature at standard conditions of about 190° F., and a bottom temperature of from about 380° F. up to about 430° F. high purity trimethyl phosphate is removed from the top of this distillation zone or column. The bottom temperature should not exceed about 430° F. A significant departure from these conditions results in decomposition of the trimethyl phosphate with liberation of measurable amounts of water, ethane and methane. It is also important, even at this late stage of the separation, that the residence time be not of long duration. Thus, only a short holdup or residence time should be permitted within the bottom of the distillation zone, preferably less than two hours. The effect of this important reaction variable is shown in the table below wherein conditions within the bottom of a column were substantially constant from one run to the next except for variation in holdup time. It is seen from these data that the overall yield of trimethyl phosphate decreases proportionally to increased holdup time at the bottom of the distillation zone.

TABLE

*Adverse Effect of Prolonged Holdup Time*

| Run | Holdup time (hours) | Percent yield of trimethyl phosphate |
|---|---|---|
| A | 1 | 75.2 |
| B | 4.4 | 64.9 |
| C | 6.5 | 58.8 |

In accordance with another highly preferred embodiment, to even more effectively strip the hydrogen chloride and methanol from the trimethyl phosphate and to also minimize the cleavage reaction, a stripping agent is employed. The stripping agent is introduced into the distillation zone and is removed, generally from the first separation zone, with the hydrogen chloride. The stripping agent is a liquid nonreactive with the trimethyl phosphate of the reaction mixture and is preferably a compound having a boiling point intermediate that of methanol and trimethyl phosphate. Preferably also the stripping agent is a compound which undergoes a phase separation with methanol and hydrogen chloride. The stripping agent used is one which increases the activity coefficient of the hydrogen chloride in the solution thereby reducing its concentration in contact with the trimethyl phosphate. Use of a stripping agent of the preferred type also results in another advantage inasmuch as less cooling is required. Thus, the overhead condensing temperature for a particular operating temperature is increased by the presence of the stripping agent. Alternatively, less vacuum is applied to achieve a given desired hydrogen chloride concentration. The stripping agent is selected by reference to the foregoing physical properties and can thus be any of a very wide variety of compounds, for example, acyclic, cyclic or aromatic compounds containing generally up to about 10 carbon atoms. Suitable aliphatic compounds which can be employed are those containing from about 2 to about 10 carbon atoms, whether straight chain or branched chain, saturated or unsaturated, substituted or unsubstituted. Illustrative of such compounds are, for example, ethylene dichloride, ethylene dibromide, 1,1,2-trichloroethylene, isopentane, heptane, nonane, decane and the like. Suitable cyclic hydrocarbons include compounds having from about 3 to about 10 carbon atoms. Such, for example, include cyclopropane, cyclopentane, cyclohexane, chlorocyclohexane, cyclodecane and the like. Suitable aromatic hydrocarbons include compounds generally containing from 6 to about 10 carbon atoms, and are preferably mononuclear aromatic hydrocarbons. Illustrative of such compounds are, for example, benzene, chlorobenzene, toluene, p-ethyl benzene, m-xylene, o-cresol, triethyl benzene and the like.

For more effective stripping, rather than employ a simple distillation, it is preferable to employ at least the equivalent of a plurality of plates within the first separation zone, and within the distillation zone. Generally, a packed column is preferred, though actual plates can be used. Under the conditions defined, methanol and hydrogen chloride are removed with the stripping agent from the top of the first separation zone and the stripping agent is introduced near the bottom of the zone. The solution of trimethyl phosphate within the second separation zone can then be subjected to treatment in a separation zone, prior to transfer to the distillation zone, to react out the chlorides. This can be done conveniently by transferring the trimethyl phosphate solution through a tubular delivery tube or reactor, while providing sufficient temperature and reaction time within the tube to effectively destroy the chlorides. The trimethyl phosphate solution is thus transferred to another separation column wherein the trimethyl phosphate can be separated by distillation. The trimethyl phosphate product recovered from the distillation is of very high purity, usually from about 98 to 100 percent, and is essentially free of chlorides.

The following are typical examples illustrating the process claimed. The runs given in the examples were carried out in a first vertical column packed with Raschig rings graded in size to give the desired residence time within the column, and also to provide the equivalent of five theoretical plates. Associated with and near the bottom of the column was a reboiler. Adjacent this first column and reboiler was a distillation column. The methanol-phosphorus oxychloride reaction mixture was fed into the top of the first column. Where a stripping agent was employed it was fed into the reboiler and was removed, with hydrogen chloride, from the top of the first column.

Example I immediately following shows a highly satisfactory run permitting a high recovery of high purity trimethyl phosphate. Thus, a reaction mixture of the molar compositon shown (feed) was continuously fed into the top of a first column. The molar composition of the products which were removed from the top of the column (overhead) and from the reboiler (bottom) are also shown.

EXAMPLE I

|  | Feed | Overhead | Bottom |
|---|---|---|---|
| Trimethyl phosphate | 85 | 0.8 | 79.7 |
| Methanol | 250 | 247.5 | 2.5 |
| Hydrogen chloride | 130 | 125.5 | Nil |
| Dimethyl phosphoryl chloride | 5 | | |
| $CH_3Cl$ | 1 | 10.4 | |
| Chlorides | | | 0.14 |
| Cleavage acids | 10 | | 19.4 |

Conditions within the packed column (overhead) and within the reboiler (bottom) were as given in the following table.

|  | Temperature, °F. | Pressure, mm. | Residence time |
|---|---|---|---|
| Overhead | 37 | 16 | 3 minutes. |
| Bottom | 228 | 40 | 1 hour 10 minutes. |

The product from the reboiler was fed into a second column having five plates. The trimethyl phosphate was distilled from the top of the second column at an overhead temperature of 190° F. and at a bottom temperature of 420° F. A yield of 79.7 moles of high purity trimethyl phosphate was obtained. This represents a recovery of 93.7 percent of the trimethyl phosphate originally introduced into the column.

Example II again shows a highly satisfactory run wherein a very high yield of high purity trimethyl phosphate was obtained.

The table immediately following gives a material balance of the molar quantities of materials entering and leaving the first column as in the above example.

EXAMPLE II

|  | Feed | Overhead | Bottom |
|---|---|---|---|
| Trimethyl phosphate | 90 | 0.7 | 84 |
| Methanol | 170 | 168 | 2 |
| Hydrogen chloride | 96 | 90.7 |  |
| Dimethyl phosphoryl chloride | 5 |  |  |
| CH₃Cl | 1 | 11.2 |  |
| Chlorides |  |  | 0.14 |
| Cleavage acids | 5 |  | 15.2 |

The following table gives other conditions within the first column.

|  | Temperature, °F. | Pressure, mm. | Residence time |
|---|---|---|---|
| Overhead | 39 | 20 | 2.5 minutes. |
| Bottom | 225 | 30 | 1 hour 40 minutes. |

After distillation of the bottom product in a 5 tray column wherein was maintained an overhead temperature of 190° F. and a bottom temperature of 410° F., a yield of 84 moles of high purity trimethyl phosphate was recovered. This represents a recovery of 93.3 percent of the trimethyl phosphate initially introduced into the column.

It will be noticed that in both of the above examples, even though the trimethyl phosphate is readily acceptable by industry, and is in fact a high standard or high purity product, nevertheless some chlorides are obtained in the trimethyl phosphate product.

In Example III following, even this small amount of chloride impurities is almost completely eliminated from the trimethyl phosphate product by treating the residue from the reboiler in a separate multistage zone intermediate the first column and the distillation column.

EXAMPLE III

The overall material balance of materials entering and leaving the first column, in moles, for another run generally similar to the foregoing examples was as follows:

|  | Feed | Overhead | Bottom |
|---|---|---|---|
| Trimethyl phosphate | 85 | 0.8 | 78 |
| Methanol | 155 | 153 | 2 |
| Hydrogen chloride | 128 | 123 |  |
| Dimethyl phosphoryl chloride | 5 |  |  |
| CH₃Cl | 1 | 12.1 |  |
| Chlorides |  |  | 0.01 |
| Cleavage acids | 10 |  | 21.2 |

Other conditions within the column were as given below:

|  | Temperature, °F. | Pressure, mm. | Residence time |
|---|---|---|---|
| Overhead | 37 | 20 | 3 minutes. |
| Bottom | 227 | 30 | 1 hour 30 minutes. |

The trimethyl phosphate reaction mass from the reboiler was passed through a tubular member and then discharged into the distillation zone. The time of passage of the reaction mass through the tubular member was such as to provide a holdup time of 10 minutes. The temperature maintained within this member was approximately 225° F. Upon distillation it was found that a very large proportion of the chloride impurities which would have resulted pursuant to this invention as in the above examples, was eliminated. The chloride impurities were thus reduced to approximately only about 7 percent of their former concentration, as given in foregoing Examples I and II.

EXAMPLE IV

When the foregoing example is repeated in all details except that a residence time of 50 minutes is maintained within the tubular member, no chloride impurities whatever are found in the trimethyl phosphate product.

EXAMPLE V

In another run, an overall material balance of the molar quantities of materials entering and leaving the first column, is as follows:

|  | Feed | Overhead | Bottom |
|---|---|---|---|
| Trimethyl phosphate | 85 | 0.8 | 78 |
| Methanol | 155 | 153 | 2 |
| Hydrogen chloride | 128 | 122 |  |
| Dimethyl phosphoryl chloride | 5 |  |  |
| CH₃Cl | 1 | 12.1 |  |
| Chlorides |  |  | 0.01 |
| Cleavage acids | 10 |  | 21.2 |

Other conditions of operation are as follows:

|  | Temperature, °F. | Pressure, mm. | Residence time |
|---|---|---|---|
| Overhead | −10 | 5 | 3 minutes. |
| Bottom | 180 | 15 | 1 hour 30 minutes. |

A yield of 91.7 percent trimethyl phosphate is obtained.

EXAMPLE VI

An overall material balance of the molar quantities of materials entering and leaving the first separation zone or column was as follows:

|  | Feed | Overhead | Bottom |
|---|---|---|---|
| Trimethyl phosphate | 85 | 0.8 | 68 |
| Methanol | 210 | 208 | 2 |
| Hydrogen chloride | 120 | 103.9 | Nil |
| Dimethyl phosphoryl chloride | 5 |  |  |
| CH₃Cl | 1 | 22 |  |
| Chlorides |  |  | 0.07 |
| Cleavage acids | 10 |  | 31.2 |

Conditions within the column were as given below:

|  | Temperature, °F. | Pressure, mm. | Residence time |
|---|---|---|---|
| Overhead | 125 | 51 | 7 minutes. |
| Bottom | 270 | 61 | 1 hour 30 minutes. |

Example VII shows a run wherein toluene was employed as a stripping agent, 77 moles of toluene being used per 100 moles total phosphorus.

EXAMPLE VII

The molar quantities of materials entering and leaving the first separation zone, other than toluene, were as follows:

|  | Feed | Overhead | Bottom |
|---|---|---|---|
| Trimethyl phosphate | 85 | 1.5 | 80.0 |
| Methanol | 160 | 158 | 2 |
| Hydrogen chloride | 112 | 108.1 |  |
| Dimethyl phosphoryl chloride | 5 |  |  |
| $CH_3Cl$ | 1 | 9.8 |  |
| Chlorides |  |  | 0.1 |
| Cleavage acids | 10 |  | 18.4 |

The conditions of operation were as follows:

|  | Temperature, °F. | Pressure, mm. | Residence time |
|---|---|---|---|
| Overhead | 66 | 101 | 2.5 minutes. |
| Bottom | 287 | 110 | 1 hour. |

It is thus observed that the overhead condensing temperature in particular is slightly increased by the presence of the stripping agent. The bottom temperature is also increased without harmful effects to the production of trimethyl phosphate for when the trimethyl phosphate is distilled off as in Example I, 79.6 moles of high purity trimethyl phosphate was obtained. This represents a recovery of 93.7 percent of the trimethyl phosphate initially introduced into the column.

EXAMPLE VIII

Example VII is repeated in all details except that in these instances other compounds are employed as stripping agents. Thus, methyl chloroform, hexene-1, n-heptane, octene-2, n-octane, decane, cyclohexane, cyclooctane, p-xylene, isopropyl benzene and p-diethyl benzene are employed as stripping agents, respectively. Again, as in the foregoing example, high yields of trimethyl phosphate and the other important benefits described above are obtained.

Having fully described the nature of the present invention, the need therefor, and the best modes for carrying it out, it is not intended that the invention be limited except within the spirit and scope of the invention claimed.

What is claimed is:

1. A process for the separation of hydrogen chloride and methanol from a trimethyl phosphate reaction mixture comprising continuously feeding a charge including methanol, hydrogen chloride and trimethyl phosphate into a first zone, said feed containing from about 10 mole percent to about 35 mole percent hydrogen chloride, based on the total feed, maintaining said first zone at a temperature of from about −10° F. to about 125° F. while providing a residence time for the charge of from about 1 to about 7 minutes thereby, separating from the reaction mixture a hydrogen chloride-methanol rich fraction, and then passing the residual reaction mixture into a second zone, said second zone being maintained at a temperature of from about 180° F. to about 290° F., and therein substantially removing any remaining hydrogen chloride from the last-named mixture.

2. A process for the separation of hydrogen chloride and methanol from a trimethyl phosphate reaction mixture comprising continuously feeding a charge including methanol, hydrogen chloride and trimethyl phosphate into a first zone, said feed containing from about 10 mole percent to about 25 mole percent hydrogen chloride, based on the total feed, maintaining said first zone at a temperature of from about 30° F. to about 70° F. while providing a residence time of from about 3 to about 5 minutes thereby, separating from the reaction mixture a hydrogen chloride-methanol rich fraction, and then passing the residual mixture into a second zone, said second zone being maintained at a temperature of from about 180° F. to about 230° F., therein substantially removing any remaining hydrogen chloride from the last-named mixture, and then passing the residual mixture into a distillation zone, the bottom temperature of which is maintained at a temperature of from about 380° F. to about 430° F., and then removing the trimethyl phosphate from the upper portion of said zone.

3. A process for the separation of hydrogen chloride and methanol from a trimethyl phosphate reaction mixture comprising continuously feeding a charge including methanol, hydrogen chloride and trimethyl phosphate into a first zone, said feed containing from about 10 mole percent to about 35 mole percent hydrogen chloride, based on the total feed, maintaining said first zone at a temperature of from about −10° F. to about 125° F. and at a pressure of from about 0.1 pound per square inch to about 0.6 pound per square inch while providing a residence time for the charge of from about 1 to about 7 minutes, thereby separating from the reaction mixture a hydrogen chloride-methanol rich fraction, then passing the residual reaction mixture into a second zone maintained at a temperature of from about 180° F. to about 290° F. to substantially remove any remaining hydrogen chloride therefrom, and then passing the substantially hydrogen chloride free residual reaction mixture from the second zone through a multistage reaction zone maintained at substantially the same temperature as the second zone while providing a residence time within the multistage zone of from about 10 minutes to about 50 minutes.

4. The process of claim 3 wherein the residence time within the multistage zone is about 10 minutes.

5. A process for the separation of hydrogen chloride and methanol from a trimethyl phosphate reaction mixture comprising continuously feeding a charge including methanol, hydrogen chloride and trimethyl phosphate into a first zone, said feed containing from about 10 mole percent to about 35 mole percent hydrogen chloride, based on the total feed, maintaining said first zone at a temperature of from about −10° F. to about 125° F. and at a pressure of from about 0.1 pound per square inch to about 0.6 pound per square inch while providing a residence time for the charge of from about 1 to about 7 minutes, thereby separating from the reaction mixture a hydrogen chloride-methanol rich fraction, and then passing the residual reaction mixture into a second zone, said second zone being maintained at a temperature of from about 180° F. to about 290° F. while providing a residence time of from about 0.75 hour to about 2 hours, and therein substantially removing any remaining hydrogen chloride from the last-named mixture.

6. The process of claim 5 wherein the residence time of the residual reaction mixture within the second zone is maintained at from about 50 minutes to about 80 minutes.

7. A process for the separation of hydrogen chloride and methanol from a trimethyl phosphate reaction mixture comprising continuously feeding a charge including methanol, hydrogen chloride, trimethyl phosphate and a stripping agent, defined hereafter, into a first zone, said feed containing from about 10 mole percent to about 35 mole percent hydrogen chloride, based on the total feed, maintaining said first zone at a temperature of from about −10° F. to about 125° F. while providing a residence time of from about 1 to about 7 minutes, thereby separating from the reaction mixture the stripping agent and a hydrogen chloride-methanol rich fraction, and then passing the residual mixture into a second zone, maintained at a temperature of from about 180° F. to about 290° F. to substantially remove any remaining hydrogen chloride, therefrom, and then passing the residual mixture into a distillation zone the bottom temperature of which is maintained at a temperature of from about 380° F. to about 430° F., adding to the distillation zone a stripping agent characterized in that it is a liquid nonreactive with the trimethyl phosphate and is a compound selected from the group consisting of aliphatic compounds containing from about 2 to about 10 carbon atoms, cyclic hydrocarbons having from about 3 to about 10 carbon atoms and aromatic hydrocarbons having from 6 to about 10 carbon atoms, recovering trimethyl phosphate from said distillation zone and feeding the stripping agent into the first zone.

8. The process of claim 7 wherein the stripping agent is further characterized in that it is a compound having a boiling point intermediate that of methanol and trimethyl phosphate, and is a compound which undergoes a phase separation with methanol and hydrogen chloride.

9. The process of claim 8 wherein the stripping agent is toluene.

References Cited in the file of this patent

UNITED STATES PATENTS

| | | |
|---|---|---|
| 1,766,720 | Nicolai | June 24, 1930 |
| 2,078,421 | Shuman | Apr. 13, 1934 |
| 2,335,511 | Havemann et al. | June 11, 1940 |
| 2,504,121 | Gamrath | Apr. 18, 1950 |

FOREIGN PATENTS

| | | |
|---|---|---|
| 564,321 | Germany | Nov. 17, 1932 |